US010131791B2

(12) United States Patent
Gane et al.

(10) Patent No.: US 10,131,791 B2
(45) Date of Patent: Nov. 20, 2018

(54) PROCESS FOR THE PREPARATION OF A TREATED MINERAL FILLER PRODUCT, THE OBTAINED MINERAL FILLER PRODUCT AND ITS USES

(75) Inventors: Patrick A. C. Gane, Rothrist (CH); Matthias Buri, Rothrist (CH); René Burkhalter, Herzogenbuchsee (CH)

(73) Assignee: Omya International AG, Oftringen (CH)

( * ) Notice: Subject to any disclaimer, the term of this patent is extended or adjusted under 35 U.S.C. 154(b) by 632 days.

(21) Appl. No.: 12/450,719

(22) PCT Filed: Apr. 11, 2008

(86) PCT No.: PCT/IB2008/000889
§ 371 (c)(1),
(2), (4) Date: Oct. 8, 2009

(87) PCT Pub. No.: WO2008/125955
PCT Pub. Date: Oct. 23, 2008

(65) Prior Publication Data
US 2010/0041811 A1  Feb. 18, 2010

(30) Foreign Application Priority Data

Apr. 13, 2007  (EP) .................................. 07007599

(51) Int. Cl.
| *C08K 3/26* | (2006.01) |
| *C09C 1/02* | (2006.01) |
| *C09C 3/08* | (2006.01) |
| *C08K 5/098* | (2006.01) |
| *C08K 5/5419* | (2006.01) |
| *C08K 9/04* | (2006.01) |
| *C08K 9/06* | (2006.01) |
| *C08L 23/06* | (2006.01) |

(52) U.S. Cl.
CPC ............... *C09C 1/021* (2013.01); *C08K 3/26* (2013.01); *C08K 5/098* (2013.01); *C08K 5/5419* (2013.01); *C08K 9/04* (2013.01); *C08K 9/06* (2013.01); *C08L 23/06* (2013.01); *C09C 1/02* (2013.01); *C09C 3/08* (2013.01); *C01P 2002/88* (2013.01); *C01P 2004/61* (2013.01); *C01P 2004/84* (2013.01); *C01P 2006/22* (2013.01); *C08K 2003/265* (2013.01)

(58) Field of Classification Search
CPC ... C09C 1/02; C09C 1/021; C09C 3/08; C01P 2002/88; C01P 2004/61; C01P 2004/84; C01P 2006/22; C08K 3/26; C08K 5/098; C08K 5/5419; C08K 9/04; C08K 9/06; C08K 2003/265; C08L 23/06
USPC ................ 428/403; 524/425; 423/419.1, 430
See application file for complete search history.

(56) References Cited

U.S. PATENT DOCUMENTS

| 4,407,986 A | 10/1983 | Nomura et al. |
| 4,520,073 A | 5/1985 | Randolph et al. |
| 5,135,967 A | 8/1992 | Aumann et al. |
| 2002/0102404 A1 | 8/2002 | Go et al. |

FOREIGN PATENT DOCUMENTS

| FR | 2 784 371 A1 | 4/2000 |
| JP | 54162746 A | 12/1979 |
| SU | 1198001 A1 | 12/1985 |
| SU | 1326590 A1 | 7/1987 |
| WO | 9202587 A1 | 2/1992 |
| WO | 9961521 A1 | 12/1999 |
| WO | 0020336 A1 | 4/2000 |
| WO | 0132787 A1 | 5/2001 |
| WO | WO 01/32787 | 5/2001 |
| WO | 02055596 A1 | 7/2002 |
| WO | 03082966 A1 | 10/2003 |
| WO | 05075353 A1 | 8/2005 |

OTHER PUBLICATIONS

International Search Report for PCT Application No. PCT/IB2008/000889.
Written Opinion of the International Searching Authority for PCT Application No. PCT/IB2008/000889.
European Search Report dated Sep. 14, 2007 for European Application No. 07007599.9.

*Primary Examiner* — Irina S Zemel
(74) *Attorney, Agent, or Firm* — Amster, Rothstein & Ebenstein LLP

(57) ABSTRACT

The present invention relates to the domain of mineral filler treatment processes. The process for the preparation of a treated mineral filler product comprises the following steps: (a) treating at least one dry mineral filler with at least one Group II or Group III salt of a C8 to C24 aliphatic monocarboxylic acid to produce an intermediate mineral filler product; followed by (b) treating the intermediate mineral filler product of step (a) with at least one C8 to C24 aliphatic monocarboxylic acid to produce a treated mineral filler product. Applications in particular to prepare treated mineral filler products (such as Ca carbonate) to be used in plastic applications such as in polypropylene (PP)- or polyethylene (PE)-based breathable or extrusion coating film applications.

31 Claims, 2 Drawing Sheets

Figure 1:
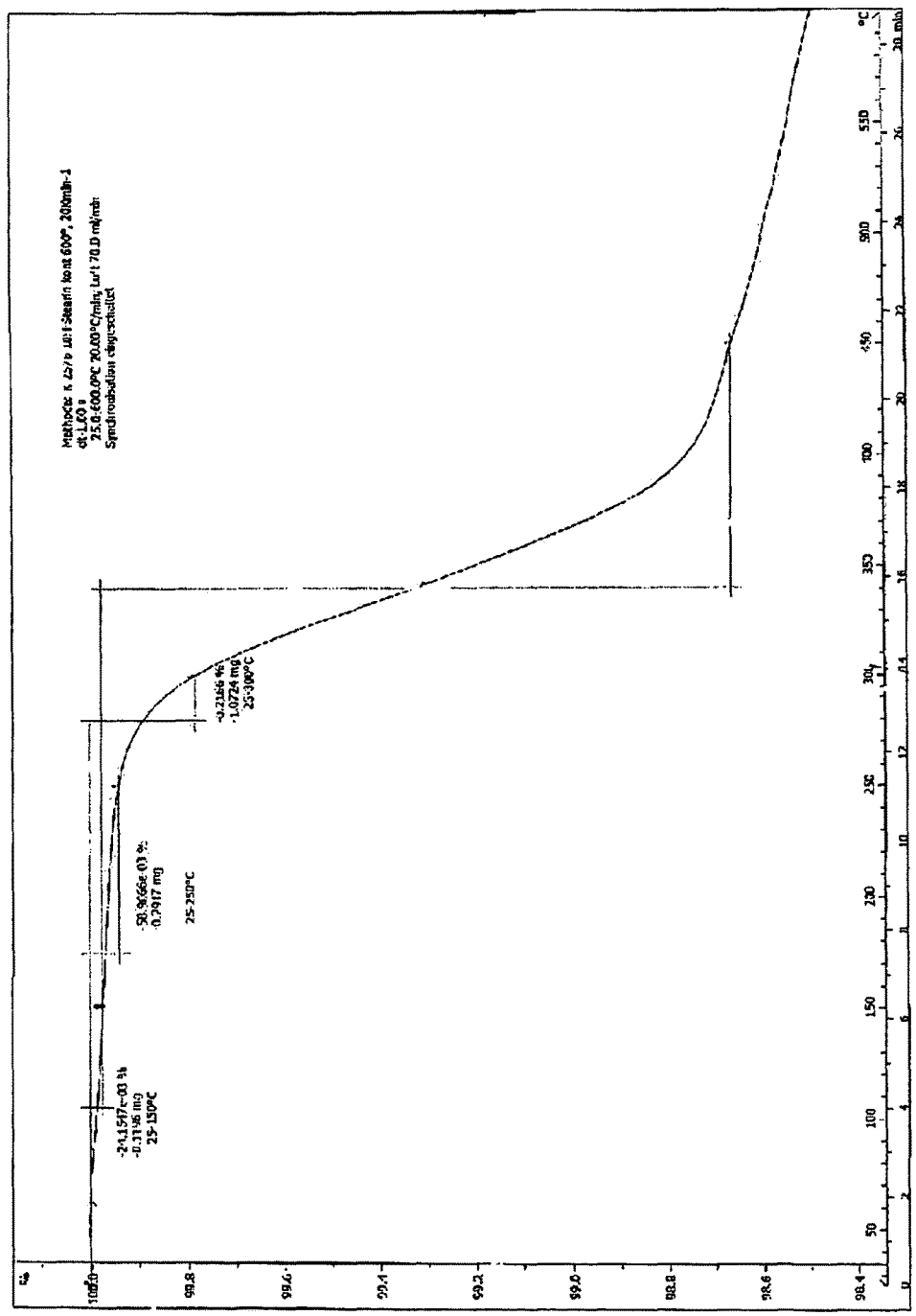

PROCESS FOR THE PREPARATION OF A TREATED MINERAL FILLER PRODUCT, THE OBTAINED MINERAL FILLER PRODUCT AND ITS USES

This is a U.S. national phase of PCT Application No. PCT/IB2008/000889, filed Apr. 11, 2008, which claims the benefit of European Application No. 07007599.9, filed Apr. 13, 2007.

The present invention relates to the domain of mineral filler treatment processes, in particular to prepare treated mineral filler products to be used in plastic applications, and especially in polypropylene (PP)- or polyethylene (PE)-based breathable or extrusion coating film applications.

The object of the present invention is a process for the preparation of a treated mineral filler product characterised in that the process comprises the following steps:
  (a) treating at least one dry mineral filler with at least one Group II or Group III salt of a C8 to C24 aliphatic monocarboxylic acid to produce an intermediate mineral filler product; followed by
  (b) treating the intermediate mineral filler product of step (a) with at least one C8 to C24 aliphatic monocarboxylic acid to produce a treated mineral filler product.

Another object of the present invention is a product obtained by the process of the invention.

Another object of the present invention are applications of products obtained by the process of the invention in plastic applications, especially in polyethylene (PE), polypropylene (PP), polyurethane (PU) and polyvinylchloride (PVC) applications, and more particularly in PP- or PE-based breathable or extrusion coating film applications.

Mineral fillers, such as calcium carbonate, are often used as particulate fillers in polymer products.

The presence of volatiles associated with mineral fillers that evolve at temperatures reached during the application of such mineral fillers and/or in the processing of such mineral filler-comprising products may lead to the degradation of the quality of the final mineral-comprising polymer product. This is particularly a problem encountered in the preparation of mineral-filler comprising, and more particularly calcium carbonate comprising, PP- or PE-based breathable or extrusion coating films.

Moreover, volatiles may lead to a reduction in the tensile and tear strength of such a film, and may degrade its visible aspects, in particular of its visible uniformity.

Volatiles can generate excessive foaming of the mineral filled polymer melt during a step of compounding, causing unwanted product build-up at the vacuum extraction and hence, forcing a reduced output rate.

Such volatiles may, for example, be:
  inherently associated with the mineral filler ("inherent volatiles"), and is especially associated water, and/or
  introduced during the treatment of the mineral filler ("added volatiles"), for example to render the mineral filler more dispersible within a plastic medium, and/or
  generated by the reaction of inherent organic materials and/or added organic materials, with the mineral filler; such reactions may especially be induced or enhanced by the temperatures reached during the introduction and/or processing of the polymeric material comprising the treated mineral filler, such as during the extrusion or compounding process; and/or
  generated by the degradation of inherent organic materials and/or added organic materials, forming $CO_2$, water and possibly low molecular mass fractions of these organic materials; such a degradation may especially be induced or enhanced by the temperatures reached during the introduction and/or processing of the polymeric material comprising the treated mineral filler, such as during the extrusion or compounding process.

The mass fraction of all of the volatiles relative to the mass of a sample of mineral filler—including volatiles introduced as a result of common mineral filler preparation steps including grinding, with or without grinding aid agents, benefication, with or without flotation aid or other agents, and other pre-treatment agents not expressly listed above, detected according to the thermogravimetric analysis described hereafter will be referred to as the "total volatiles" throughout the present specification and claims.

For the purposes of the present Application, the total volatiles associated with mineral fillers and evolved over the given temperature range will be characterised according to % mass loss of the mineral filler sample over this temperature range as presented on a thermogravimetric (TGA) curve; the preparation of such a thermogravimetric (TGA) curve is a technique well known to the skilled man.

Such an analytical method provides information regarding losses of mass with great accuracy, and is common knowledge; it is, for example, described in "Principles of Instrumental analysis", fifth edition, Skoog, Holler, Nieman, 1998 (first edition 1992) in Chapter 31 pages 798 to 800, and in many other commonly known reference works.

The skilled man will be able to determine the "total volatiles" by very simple routine tests, namely by performing a thermogravimetric analysis (TGA) using a Mettler Toledo TGA 851 based on a sample of 500+/−50 mg and scanning temperatures from 25 to 300° C. at a rate of 20° C./minute under an air flow of 70 ml/min.

The % mass loss, corresponding to the total volatiles, over a given temperature on the TGA curve so obtained is thereafter determined using $Star^e$ SW 9.01 software. Using this software, the curve is first normalised relative to the original sample weight in order to obtain mass losses in % values relative to the original sample. Thereafter, the temperature range of 25 to 300° C. is selected and the step horizontal (in German: "Stufe horizontal") option selected in order to obtain the % mass loss over the selected temperature range.

Figure 2:
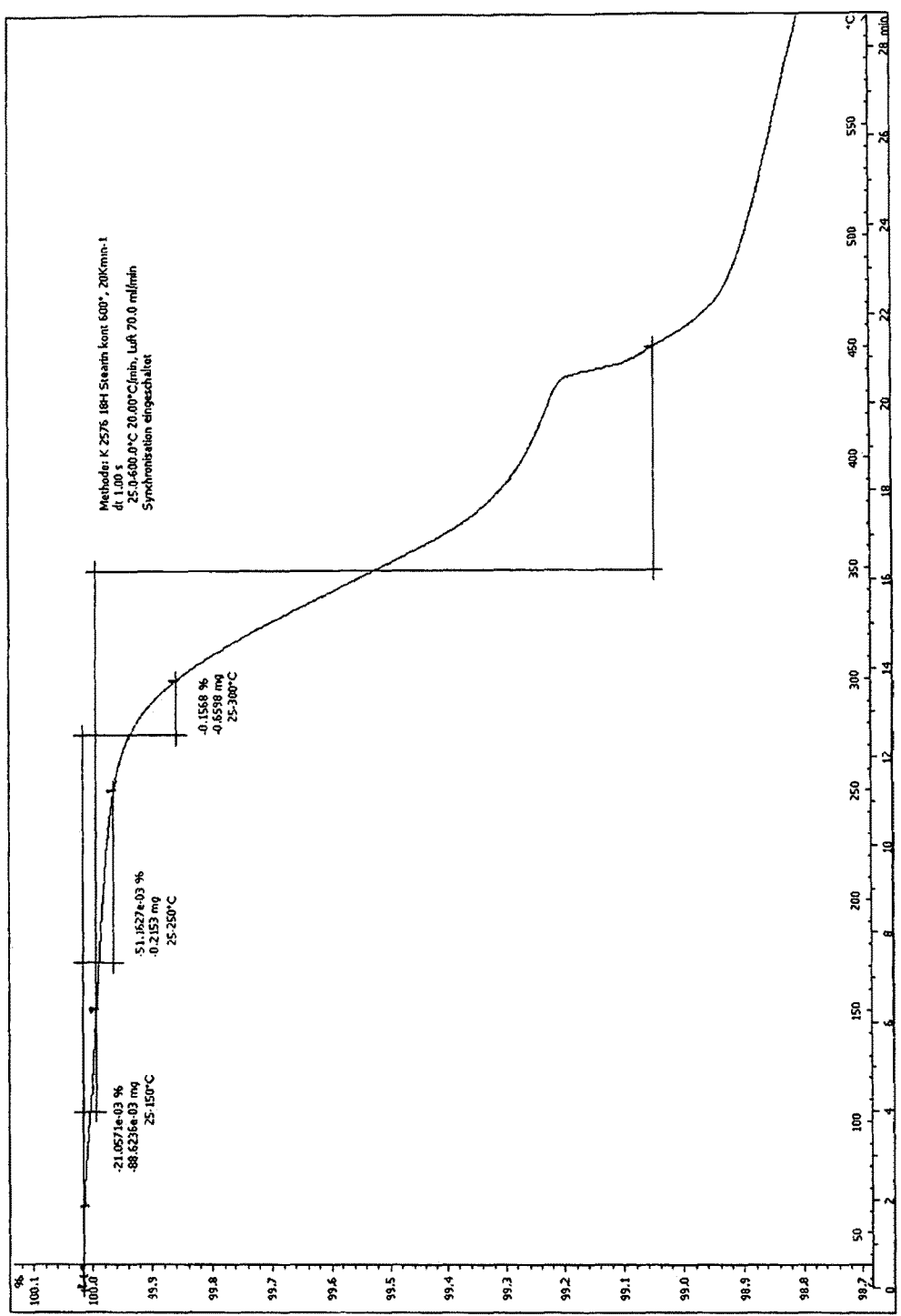

FIGS. 1 and 2, described hereafter, are illustrative thereof.

One obvious means to reduce the total volatiles associated with a mineral filler could be to reduce the amount of additives leading to the production of added volatiles. However, often, as in the case when a mineral filler is applied in a plastic application, minimum quantities of additives are needed to ensure other functions. In the case of breathable film applications, additives are known to be introduced to provide the mineral filler with a hydrophobic coating and to improve the dispersability of the mineral filler in the film precursor material as well as possibly to improve the processability of this film precursor material and/or properties of the final application products. A reduction in the quantity of such additives would unacceptably compromise the resulting film quality.

In response to this problem of the skilled man, who knows of documents describing the simple addition of an aliphatic carboxylic acid to a mineral filler, the applicant has supprisingly found that mineral fillers treated according to the process of the invention provide the skilled man with the possibility to reduce the quantity of volatiles evolved for a given quantity of treatment agent relative to the solutions presented in the prior art.

When the prior art makes reference to a mineral filler treatment comprising an aliphatic carboxylic acid, which in some cases may also commonly be referred to as a fatty acid, and an aliphatic carboxylic acid salt, it not only fails to recognise the advantages provided by the identification of a precise order of process steps, but indeed directs the skilled man away from the technology of the present invention.

In this respect, WO 00/20336 relates to an ultrafine natural calcium carbonate, which may be treated with one or several fatty acids or one or several salts or mixtures thereof, and which is used as a rheology regulator for polymer compositions. Nowhere does this document disclose nor suggest the advantageous process of the present invention characterised by its precise order of addition of an aliphatic carboxylic acid salt and an aliphatic carboxylic acid to a mineral filler.

Likewise, U.S. Pat. No. 4,407,986 recites a precipitated calcium carbonate that is surface-treated with a dispersant that may include higher aliphatic acids and their metal salts, but fails to provide any information regarding a process in which an aliphatic carboxylic acid and an aliphatic carboxylic acid salt are necessarily and advantageously added to a mineral filler in the given order of the present invention. Indeed, the particular combination of a higher aliphatic acid and a metal salt of a higher aliphatic acid is not even exemplified.

In U.S. Pat. No. 5,135,967, example 7 discloses in a mixture of an ammonium salt of 12-hydroxystearic acid in combination with stearic acid and a mineral filler. Again, no precise order of additive addition is recited.

WO 03/082966 relates to a cross-linkable and/or cross-linked nanofiller composition which, in certain embodiments when coated, may be coated with stearic acid, stearate, silane, siloxane and/or titanate. Again, no information is provided regarding a process in which an aliphatic carboxylic acid and an aliphatic carboxylic acid salt are preferentially and necessarily added to a mineral filler in a given order.

US 2002/0102404 describes calcium carbonate particles coated on their surface with a combination of saturated and unsaturated aliphatic carboxylic acids and salts thereof along with an organic compound such as a phthalic ester. Not only does this document not make any suggestion as to the inventive process of the present application, but indeed suggests the skilled man combine any treatment agents prior to their introduction to the calcium carbonate.

Claim 11 of WO 92/02587 indicates that a saponified sodium salt solution of at least one high molecular weight unsaturated fatty acid or combination of at least one high molecular weight unsaturated fatty acid and at least one high molecular weight unsaturated acid, may be added to a pre-heated slurry of precipitated calcium carbonate, to ultimately produce a desired level of fatty acid coating on the calcium carbonate before proceeding with further process steps.

The abstract of JP54162746 discloses a composition comprising certain relative amounts of rigid vinyl chloride resin, fatty acid treated-colloidal calcium carbonate, and barium stearate. Though no explicit information is provided regarding the order of addition of the various components of this composition, this document nonetheless suggests to the skilled man that the calcium carbonate first be treated with a fatty acid before encountering the barium stearate, which is entirely contrary to the principle of the present invention.

WO 01/32787 describes a particulate alkaline earth metal carbonate material product which has on its particles a coating of hydrophobic material comprising a composition formed of (a) a first component which comprises the reaction product of the alkaline earth metal carbonate and at least one given aliphatic carboxylic acid and (b) a second component having a carbonate release temperature substantially higher than the first component comprises a compound of formula CH3(CH2)mCOOR, wherein, among other options, R is a Group II metal radical; further constraints regarding the quantities of the first and second components are additionally indicated. This patent application focuses and exemplifies the simultaneous addition of the first and second components. Nowhere does this document describe nor suggest a process according to the present invention, and in particular this document does not describe or suggest the addition of an aliphatic carboxylic acid salt to a mineral filler prior to the addition of an aliphatic carboxylic acid to produce a treated mineral filler product. Quite to the contrary, WO 01/32787 underlines the importance of obtaining the reaction product of the alkaline earth metal carbonate and the aliphatic carboxylic acid, which directs the skilled man away from introducing any treatment agent to the calcium carbonate before the introduction of this aliphatic carboxylic acid.

As a conclusion, no leading line or direction is available to the skilled man in the prior art, even in an indistinct manner, which would suggest the particular process of the present invention, which is able to reduce the total volatiles of a treated mineral filler product.

Additional prior art, namely WO 99/61521 and WO 2005/075353, which suggest a reduction of only the inherent water and picked up humidity of the starting mineral filler, entirely missed the point of reducing the other volatiles besides water which contribute to the total volatiles, and that this total volatile reduction is a useful parameter and indeed, the only one parameter needed. This prior art also entirely missed the point that the special order of addition of the treatment agents of the present invention is able to limit the total volatiles measured by TGA.

The Applicant has surprisingly found that total volatiles measured by TGA can be reduced by a process for the preparation of a treated mineral filler product characterised in that the process comprises the following steps:
(a) treating at least one dry mineral filler with at least one Group II or Group III salt of a C8 to C24 aliphatic monocarboxylic acid to produce an intermediate mineral filler product; followed by
(b) treating the intermediate mineral filler product of step (a) with at least one C8 to C24 aliphatic monocarboxylic acid to produce a treated mineral filler product.

The term "Group X" indicates the main group elements falling under column X of the Mendeleev Periodic Table. Group II and Group III are also referred to as Group IIA and Group IIIA. Moreover, Group II elements are also referred to as earth alkali elements.

The process according to the present invention especially provides treated mineral filler products featuring a total volatile content of less than 0.25%, and preferably of less than 0.23% by mass as measured according to the TGA method described hereabove.

Mineral Filler

Mineral fillers employed in the process according to the invention are especially calcium carbonate-comprising mineral fillers (such as precipitated calcium carbonate (PCC), namely one or more of the aragonitic, vateritic and calcitic mineralogical crystal forms, and/or natural ground calcium carbonate (NGCC), namely one or more of marble, limestone, or chalk, and/or dolomite) and/or plate-like minerals (featuring a length to width or length to height ratio of at least 2 as determined according to measurements made on scanning electron microscope (SEM) images), such as talc.

Such minerals fillers are well known to the average skilled man, in particular for their use in plastic formulations, such as in films or in film precursors, notably breathable or extrusion coating films, so that it will not be necessary to fully describe them in detail except when such a description is necessary for completeness and clarity due to a specific and original feature of the invention.

Preferably, in the case of the subsequent application of the mineral filler in breathable or extrusion coating films, this mineral filler is preferably a calcium carbonate and/or dolomite, and is more preferably a marble and/or dolomite.

The mineral filler can be dry ground or wet ground and dried prior to introduction into the process according to the present invention with or without grinding aids. Conventional grinding aids, such as glycols for dry grinding and polyacrylates for wet grinding, are well-known to the skilled man.

Alternatively or additionally, this mineral filler may also undergo a benefication step in order to increase the purity of this mineral filler. Such benefications include flotation and/or magnetic separation.

Alternatively or additionally, this mineral filler may also undergo a classification step prior to implementation in order to obtain a mineral filler featuring a particular particle size distribution. Typical classification steps use classification technology separating particles under the effects of a cyclone.

Preferably, the mineral filler features a $d_{50}$ of 0.5 to 10 microns, and more preferably features a $d_{50}$ of 1.5 to 1.8 microns, as measured using Malvern Mastersizer™ X instrumentation (with software version 2.18 and using the OHD presentation and analysis model), the latter $d_{50}$ range being especially preferred in view of subsequent applications in breathable or extrusion coating films.

Alternatively or additionally, it may be of interest to implement a mineral filler featuring a $d_{98}$ of less than 25 microns, as determined according to measurements made with Malvern Mastersizer™ X instrumentation (with software version 2.18 and using the OHD presentation and analysis model).

Throughout the present Application, the value of $d_x$ represents the diameter relative to which X % by weight of the particles have diameters less than $d_x$, and is determined based on diameter measurements made using Malvern Mastersizer™ X instrumentation (with software version 2.18 and using the OHD presentation and analysis model).

The mineral filler provided for the process of the invention is dry. For the purpose of the present invention, a dry mineral filler features less than 0.2% by weight of water relative to the mineral filler weight. Preferably, this mineral filler features from 0.1 to 0.2% by weight of water relative to the mineral filler weight. All % water determinations are made using a Coulometric Karl Fischer measurement method, wherein the mineral filler is heated to 220° C., and water content of the released vapour, isolated using a stream of nitrogen gas (at 100 mL/min), determined in a Coulometric Karl Fischer unit.

Step (a)

Step (a) implements at least one Group II or Group III salt of a C8 to C24 aliphatic carboxylic acid; it is understood that step (a) does not implement any C8 to C24 aliphatic carboxylic acid(s), though the skilled man will appreciate that trace amounts of this acid may be naturally present. This trace amount does not influence the process of the present invention.

In one embodiment of the process according to the invention, the Group II or Group III salt(s) of a C8 to C24 aliphatic monocarboxylic acid employed in step (a) are selected among calcium, magnesium and aluminium salts, and mixtures thereof.

In a more preferred embodiment of the process according to the invention, the Group II or Group III salt(s) of a C8 to C24 aliphatic monocarboxylic acid employed in step (a) are selected among calcium salts, magnesium salts and mixtures thereof.

Moreover, step (a) of the present invention preferably implements at least one Group II or Group III salt of a C12 to C18, and preferably of a C16 to C18 aliphatic carboxylic acid. The value of X in the designation Group II or Group III salt of a CX aliphatic carboxylic acid is intended to represent the number of carbon atoms forming the Group II or Group III salt of this aliphatic carboxylic acid.

In one embodiment of the process according to the invention, the Group II or Group III salt(s) of an aliphatic carboxylic acid of step (a) are salt(s) of a saturated aliphatic carboxylic acid. The term saturated means an iodine number of less than 1 g $I_2$/100 g sample. This iodine number determination is well-known to the skilled man, and namely implements determination of the iodine addition to a 100 g sample by back-titration of the surplus iodine solution with sodium thiosulfate.

In another embodiment of the process according to the invention, the Group II or Group III salt(s) of an aliphatic carboxylic acid of step (a) are salt(s) of a linear aliphatic carboxylic acid.

In another embodiment of the process according to the invention, the Group II or Group III salt(s) of an aliphatic carboxylic acid of step (a) are salt(s) of a hydroxylated aliphatic carboxylic acid.

In a preferred embodiment of the process according to the invention, the Group II or Group III salt(s) of an aliphatic carboxylic acid of step (a) are salt(s) of stearic and/or palmitic and/or myristic and/or lauric acid. It is most preferred to implement such salts of stearic and/or palmitic acid in the process according to the invention.

It will be understood in the whole specification and claims that the aliphatic carboxylic acid(s) of step (b) and/or the Group II or Group III salt(s) of an aliphatic carboxylic acid of step (a) may be implemented in the process of the invention in dry form or in the form of a fluid such as a melt.

In a preferred embodiment of the process according to the invention, the Group II or Group III salt(s) of an aliphatic carboxylic acid employed in step (a) are implemented in the form of a dry powder.

In the particular case where the Group II or Group III salt(s) of an aliphatic carboxylic acid of step (a) is in the form of a dry powder, it is preferable that this salt feature a $d_{98}$ of 20 microns according to screen residue measurement performed with 20 microns DIN screens.

In a preferred embodiment of the process according to the invention, the Group II or Group III salt(s) of an aliphatic carboxylic acid salt employed in step (a) are selected so as to feature a viscosity of more than 100 000 mPas, and preferably of more than 1 000 000 mPas, at 180° C. measured in a PHYSICA MCR 300 equipped with a CP50-1 instrumentation at a shear rate of 5 s(−1) and scanning temperatures from 200 to 130° C.

Step (b)

It is of note that the aliphatic carboxylic acid(s) of step (b) and the aliphatic carboxylic acid(s) of the salified aliphatic carboxylic acid(s) of step (a) are not necessarily identical. Various combinations can be easily envisioned by the skilled man.

As regards step (b) of the present invention, this step preferably implements C12 to C18, and preferably a C16 to C18 aliphatic carboxylic acid(s). The value of X in the designation CX aliphatic carboxylic acid is intended to represent the number of carbon atoms forming the aliphatic carboxylic acid.

In one embodiment of the process according to the invention, the aliphatic carboxylic acid(s) of step (b) are saturated.

In another embodiment of the process according to the invention, the aliphatic carboxylic acid(s) of step (b) are linear aliphatic carboxylic acids.

In another embodiment of the process according to the invention, the aliphatic carboxylic acid(s) employed in step (b) are hydroxylated aliphatic carboxylic acids.

In a preferred embodiment of the process according to the invention, the aliphatic carboxylic acid(s) employed in step (b) are stearic and/or palmitic and/or myristic and/or lauric acids or mixtures thereof. It is most preferred to implement stearic and/or palmitic acid in the process according to the invention.

In a preferred embodiment of the process according to the invention, the aliphatic carboxylic acid(s) employed in step (b) are implemented in step (b) in the form of a melt.

Total Treatment Agent

It may be of interest that sufficient surface treatment of the mineral filler be provided to render the mineral filler easily dispersible in polyolefins.

An appropriate range of total aliphatic carboxylic acid(s) and aliphatic carboxylic acid salt(s) added during the process of the invention is 0.2 to 8, preferably 0.6 to 5, and most preferably 3 to 4 mg of total aliphatic carboxylic acid(s) and aliphatic carboxylic acid salt(s)/$m^2$ mineral filler(s).

It is of note that throughout the present Application, the surface area ($m^2$) of a given quantity of mineral filler(s) is determined based on measurements made using the BET method, which is well known to the skilled man (ISO 9277).

In a preferred embodiment of the process according to the invention, the aliphatic carboxylic acid salts(s) employed in step (a) and the aliphatic carboxylic acid(s) employed in step (b) are selected so that their equivalent isolated mixture features a viscosity of between 5 and 400 mPas at 180° C. measured in a PHYSICA MCR 300 equipped with a CP50-1 instrumentation at a shear rate of 5 s(−1) and scanning temperatures from 200 to 130° C. It is understood that this equivalent isolated mixture is not directly implemented in the process of the invention; this characterisation of this equivalent isolated mixture serves only to assist the skilled man in selecting the appropriate aliphatic carboxylic acid salts(s) to implement in step (a) and aliphatic carboxylic acid(s) to implement in step (b).

In a particular embodiment of the process according to the invention, the aliphatic carboxylic acid employed in step (b) is 1:1 stearic acid:palmitic acid mixture, and the aliphatic carboxylic acid salt(s) employed in step (a) is a magnesium or calcium stearate.

It may be particularly advantageous to implement 0.4 by weight % of aliphatic carboxylic acid(s), based on the weight of the mineral filler in step (b), and 0.8, 0.6; 1.0 or 1.2 by weight % of Group II or Group III salt(s) of an aliphatic carboxylic acid, based on the weight of the mineral filler, in step (a).

It is most preferably to implement 0.4 by weight % of aliphatic carboxylic acid(s), based on the weight of the mineral filler in step (b), and 0.8 by weight % of Group II or Group III salt(s) of an aliphatic carboxylic acid, based on the weight of the mineral filler, in step (a).

Alternatively, it may be of interest to implement the process according to the invention such that the weight ratio of aliphatic carboxylic acid(s):Group II or Group III salt(s) of an aliphatic carboxylic acid is 1:1 to 10:1, and preferably is 1:2.

Additional Treatment Agents

It may additionally be advantageous to implement an additional treatment agent that does not correspond to a C8 to C24 aliphatic carboxylic acid, nor to a Group II or Group III salt of a C8 to C24 aliphatic carboxylic acid. A preferred, but non-limitative example of a process of the invention implementing such an additional treatment agent is a process implementing a siloxane, and preferably a polydimethylsiloxane (PDMS). Such siloxanes are known to improve the processability of plastic materials, particularly during an extrusion step.

In the case where such a siloxane is implemented in addition to the additives introduced in steps (a) and (b) according to the process of the invention, this siloxane may be advantageously dosed at 200 to 1000 ppm, preferably at 400 to 600 ppm, and most preferably at 500 ppm.

In the case where such a siloxane is implemented in addition to the additives introduced in steps (a) and (b) according to the process of the invention, this siloxane may be advantageously introduced in the process following step (b).

Product by Process

The invention also relates to treated minerals filler products obtained by the process of the invention.

Implementing the process according to the invention especially leads to treated mineral filler products featuring a total volatile content of less than 0.25%, and preferably of less than 0.23% by mass as measured according to the TGA method described hereabove, namely between 25 and 300° C.

Such a total volatile content can especially be reached by implementing:
  in step (a) of the process according to the invention, aliphatic carboxylic acid salt(s) selected so as to feature an isolated equivalent viscosity of more than 100 000 mPas, and preferably of more than 1 000 000 mPas, at 180° C. measured in a PHYSICA MCR 300 equipped with a CP50-1 instrumentation at a shear rate of 5 s(−1) and scanning temperatures from 200 to 130° C.;
  in steps (a) and (b) of the process according to the invention, aliphatic carboxylic acid(s) employed in step (b) and aliphatic carboxylic acid salt(s) employed in step (a) selected so that their equivalent isolated mixture features a viscosity of between 5 and 400 mPas at 180° C. measured in a PHYSICA MCR 300 equipped with a CP50-1 instrumentation at a shear rate of 5 s(−1) and scanning temperatures from 200 to 130° C.

Application of Final Products

Treated mineral filler product obtained by the process of the invention find applications in mixing/extruding/compounding/moulding with plastic materials, namely polyolefins or thermoplastics, such as polyethylene (PE), polypropylene (PP), polyurethanes (PU) and polyvinylchloride (PVC), in order to produce articles of manufacture, such as by extrusion/compounding, such as films, such as stretched or oriented films, and in particular such as PP- or PE-based breathable or extrusion coating films, and such as by blow moulding processes.

So obtained films, namely stretched/oriented films, such as in particular breathable films, or products obtained by extrusion/compounding or moulding or blow moulding processes, such as in particular extrusion coating films, comprising the treated mineral fillers obtained by the process according to the invention are also an object of the present invention.

EXAMPLES

All particle size measurements were performed using Malvern Mastersizer™ X instrumentation (with software version 2.18 and using the OHD presentation and analysis model).

Viscosity measurements were performed with Physica MCR 300 instrumentation under a shear rate of 5 s(−1) and equipped with a CP50-1.

Total volatiles (% volatiles evolved relative to the mass of the sample) were determined based on the curve obtained used Mettler Toledo TGA 851 instrumentation with a sample of 500+/−50 mg and scanning temperatures from 25 to 300° C. at a rate of 20° C./minute under an air flow of 70 ml/min.

The % mass loss, corresponding to the total volatiles, over a given temperature on the TGA curve so obtained was thereafter determined using Star$^e$ SW 9.01 software. Using this software, the curve was first normalised relative to the original sample weight in order to obtain mass losses in % values relative to the original sample. Thereafter, the temperature range of 25 to 300° C. was selected and the step horizontal (in German: "Stufe horizontal") option selected in order to obtain the % mass loss over the selected temperature range.

Transformation rates of the acid groups of the aliphatic carboxylic acids employed in the examples were determined by forming a slurry of a sample of the final mineral product obtained in ethanol, and thereafter performing a potentiometric titratation of the moles of remaining free acid groups using a 0.1 molar solution of KOH in methanol obtained from the company Fluka. The transformation rate was evaluated as the % weight of converted aliphatic carboxylic acid (in other words, not detected as free acid) relative to the total amount of aliphatic carboxylic acid added in the treatment process.

Example 1—Comparative Example 500 g of a cyclone-classified, marble from Carrara, Italy, dry ground using a glycol-based dry grinding aid and featuring a $d_{50}$ of approximately 1.7 microns was added to an MTI Mixer and the mixing was activated at 500 rpm. Thereafter a 1:1 mixture of dry stearic acid powder and dry palmitic acid powder at room temperature was introduced to the mixer in a quantity so as to obtain the weight % based on the weight of the marble indicated in Table 1, and the mixer contents were heated to 130° C. The contents of the mixer were mixed at 130° C. under a stirring speed of 500 rpm for a period of 10 minutes.

The product so obtained was thereafter analysed by TGA in order to determine the total volatiles. The results are presented in Table 1.

A transformation rate of the original stearic acid introduced in the process of 75% was determined.

Example 2—Comparative Example 500 g of a cyclone-classified, marble from Carrara, Italy, dry ground using a glycol-based dry grinding aid and featuring a $d_{50}$ of approximately 1.7 microns was added to an MTI Mixer and the mixing was activated at 500 rpm. Thereafter a 1:1 mixture of dry stearic acid powder and dry palmitic acid powder at room temperature was introduced to the mixer in a quantity so as to obtain the weight % based on the weight of the marble indicated in Table 1, and immediately thereafter 500 ppm of polydimethylsiloxane (PDMS) was introduced into the mixer. Thereafter the mixer contents were heated to 130° C. and the mixer content mixed at 130° C. under a stirring speed of 500 rpm for a period of 10 minutes.

The product so obtained was thereafter analysed by TGA in order to determine the total volatiles. The results are presented in Table 1.

Example 3—Comparative Example 500 g of a cyclone-classified, marble from Carrara, Italy, dry ground using a glycol-based dry grinding aid and featuring a $d_{50}$ of approximately 1.7 microns was added to an MTI Mixer and the mixing was activated at 500 rpm. Thereafter dry calcium stearate powder at room temperature was introduced to the mixer in a quantity so as to obtain the weight % based on the weight of the marble indicated in Table 1, and the mixer contents were heated to 180° C. The contents of the mixer were mixed at 180° C. under a stirring speed of 500 rpm for a period of 10 minutes.

The product so obtained was thereafter analysed by TGA in order to determine the total volatiles. The results are presented in Table 1.

Example 4—Comparative Example 500 g of a cyclone-classified, marble from Carrara, Italy, dry ground using a glycol-based dry grinding aid and featuring a $d_{50}$ of approximately 1.7 microns was added to an MTI Mixer and the mixing was activated at 500 rpm. Separately, a 1:1 mixture of dry stearic acid powder and dry palmitic acid powder was mixed by hand with calcium stearate, also in powder form, at a temperature of 130° C. in a beaker. Once a visually homogeneous molten mixture of the acid and salt were obtained, this molten mixture was allowed to cool to form a powder. The so obtained powder was thereafter added to the marble in the MTI Mixer in a quantity so as to obtain the weight % based on the weight of the marble indicated in Table 1. The contents of the mixer heated to 130° C. and were mixed at 130° C. under a stirring speed of 500 rpm for a period of 10 minutes.

The product so obtained was thereafter analysed by TGA in order to determine the total volatiles. The results are presented in Table 1.

Example 5—Invention Example 500 g of a cyclone-classified, marble from Carrara, Italy, dry ground using a glycol-based dry grinding aid and featuring a $d_{50}$ of approximately 1.7 microns was added to an MTI Mixer and the mixing was activated at 500 rpm. Thereafter calcium stearate in powder form was added to the mixer in a quantity so as to obtain the weight % based on the weight of the marble indicated in Table 1, and the mixer contents heated to 180° C. for a period of 10 minutes. Thereafter, the mixer contents continued to be mixed while allowed to cool to 130° C., at which point a 1:1 mixture of dry stearic acid powder and dry palmitic acid powder was added to the mixer in a quantity so as to obtain the weight % based on the weight of the marble indicated in Table 1. The temperature was so maintained and the contents on the mixer continued to be mixed under a stirring speed of 500 rpm for an additional 10 minutes.

The product so obtained was thereafter analysed by TGA in order to determine the total volatiles. The results are presented in Table 1.

FIG. 2 presents the TGA curve obtained for the treated mineral filler product of Example 5.

A transformation rate of the original stearic acid introduced in the process of 25% was determined.

Example 6—Invention Example 500 g of a cyclone-classified, marble from Carrara, Italy, dry ground using a glycol-based dry grinding aid and featuring a $d_{50}$ of approximately 1.7 microns was added to an MTI Mixer and the mixing was activated at 500 rpm. Thereafter calcium stearate in powder form was added to the mixer in a quantity so as to obtain the weight % based on the weight of the marble indicated in Table 1, and the mixer contents heated to 180° C. for a period of 10 minutes. Thereafter, the mixer contents continued to be mixed while allowed to cool to 130° C., at which point a 1:1 mixture of dry stearic acid powder and dry palmitic acid powder was added to the mixer in a quantity so as to obtain the weight % based on the weight of the marble indicated in Table 1, and immediately thereafter 500 ppm of polydimethylsiloxane (PDMS) was introduced into the mixer. The temperature was so maintained and the contents on the mixer continued to be mixed under a stirring speed of 500 rpm for an additional 10 minutes.

The product so obtained was thereafter analysed by TGA in order to determine the total volatiles. The results are presented in Table 1.

Example 7—Invention Example 500 g of a cyclone-classified, marble from Carrara, Italy, dry ground using a glycol-based dry grinding aid and featuring a $d_{50}$ of approximately 1.7 microns was added to an MTI Mixer and the mixing was activated at 500 rpm. Thereafter calcium stearate in powder form was added to the mixer in a quantity so as to obtain the weight % based on the weight of the marble indicated in Table 1, and the mixer contents heated to 180° C. for a period of 10 minutes. Thereafter, the mixer contents continued to be mixed while allowed to cool to 130° C., at which point a 1:1 mixture of dry stearic acid powder and dry palmitic acid powder was added to the mixer in a quantity so as to obtain the weight % based on the weight of the marble indicated in Table 1. The temperature was so maintained and the contents on the mixer continued to be mixed under a stirring speed of 500 rpm for an additional 10 minutes.

The product so obtained was thereafter analysed by TGA in order to determine the total volatiles. The results are presented in Table 1.

Example 8—Invention Example 500 g of a cyclone-classified, marble from Carrara, Italy, dry ground using a glycol-based dry grinding aid and featuring a $d_{50}$ of approximately 1.7 microns was added to an MTI Mixer and the mixing was activated at 500 rpm. Thereafter calcium stearate in powder form was added to the mixer in a quantity so as to obtain the weight % based on the weight of the marble indicated in Table 1, and the mixer contents heated to 180° C. for a period of 10 minutes. Thereafter, the mixer contents continued to be mixed while allowed to cool to 130° C., at which point a 1:1 mixture of dry stearic acid powder and dry palmitic acid powder was added to the mixer in a quantity so as to obtain the weight % based on the weight of the marble indicated in Table 1. The temperature was so maintained and the contents on the mixer continued to be mixed under a stirring speed of 500 rpm for an additional 10 minutes.

The product so obtained was thereafter analysed by, TGA in order to determine the total volatiles. The results are presented in Table 1.

Example 9—Invention Example 500 g of a cyclone-classified, marble from Carrara, Italy, dry ground using a glycol-based dry grinding aid and featuring a $d_{50}$ of approximately 1.7 microns was added to an MTI Mixer and the mixing was activated at 500 rpm. Thereafter calcium stearate in powder form was added to the mixer in a quantity so as to obtain the weight % based on the weight of the marble indicated in Table 1, and the mixer contents heated to 180° C. for a period of 10 minutes. Thereafter, the mixer contents continued to be mixed while allowed to cool to 130° C., at which point a 1:1 mixture of dry stearic acid powder and dry palmitic acid powder was added to the mixer in a quantity so as to obtain the weight % based on the weight of the marble indicated in Table 1. The temperature was so maintained and the contents on the mixer continued to be mixed under a stirring speed of 500 rpm for an additional 10 minutes.

The product so obtained was thereafter analysed by TGA in order to determine the total volatiles. The results are presented in Table 1.

FIG. 1 presents the TGA curve obtained for the treated mineral filler product of Example 9.

The results presented in Table 1 clearly demonstrate the advantage in terms of the total volatile content of the products obtained by the process of the invention.

It is of note that although Example 3 provided good results in terms of total volatiles, treatment with calcium stearate alone lead to difficulties in processing a plastic medium comprising the treated calcium carbonate of Example 3, and especially to an overly high viscosity in an extrusion step.

Notably, a compound consisting of 50% by weight of the product of Example 3, 45% by weight of a linear low density polyethylene (featuring a melt flow index (MFI) of 6, according to a measurement made at 190° C. using 2.16 kg of this polyethylene) and 5% by weight of a low density polyethylene (featuring a MFI of 3 according to a measurement made at 190° C. using 2.16 kg of this polyethylene) was formed in a Buss co-kneader. The compound so obtained was then transformed into a film using a Collin Castfilm lab line, equipped with a single screw extruder having a diameter of 30 mm and a die length of 250 mm. In front of the die, a GKD (Gebr. Kufferath AG of Düren, Germany under Article number 12105170051) bordered filter package having a diameter of 30 mm, formed of filter meshes placed one against another, each featuring a given filter mesh size, namely (in the order encountered by the incoming compound) of 630 microns, 250 microns, 120 microns, 42 microns, and 120 microns, was inserted. The pressure reached in front of this filter package was recorded with a Dynisco DYN A4-1/2-6C-7.6 pressure measurement device (capable of measuring pressures from 0 to 600 bar) 3 minutes following the commencement of the extrusion and the pressure increase determined following 20 minutes of extrusion, giving values of 80+/−5 bar and 90+/−5 bar respectively. These results were compared with those obtained with a compound prepared and processed as above but wherein the product of Example 3 was replaced with the product of Example 7, which gave a pressure 3 minutes following the commencement of the extrusion of 65+/−5 bar and a pressure increase after 20 minutes of extrusion of 10+/−5 bar. These results clearly demonstrate that a far more workable pressure is encountered when processing a product obtained according to the invention.

Considering the total volatile results of Table 1 and the transformation rate of Example 1, which indicates that a significant fraction of the acid groups of the employed stearic acid were transformed into a non-acid species, and theorising that this transformed stearic acid formed a salt by reaction with calcium carbonate, thus forming a system comprising a stearic acid and a calcium stearate, the Applicant considers that this renders the specific addition of such an acid and such an acid salt to a mineral filler in a particular order to obtain a material of particularly low total volatiles, as in Example 5, all the more surprising.

All specific surface area measurements are made via the BET method according to ISO 9277 using nitrogen, following conditioning of the sample by heating at 250° C. for a period of 30 minutes.

Example 10—Invention Example 500 g of a cyclone-classified, marble from Carrara, Italy, dry ground using a glycol-based dry grinding aid and featuring a $d_{50}$ of approximately 1.7 microns and a BET specific surface area of between 3.8 and 4.0 m$^2$/g was added to an MTI Mixer and the mixing was activated at 500 rpm. Thereafter magnesium laurate in powder form was added to the mixer in a quantity so as to obtain the weight % based on the weight of the marble indicated in Table 1, and the mixer contents heated to 180° C. for a period of 10 minutes. Thereafter, the mixer contents continued to be mixed while allowed to cool to 130° C., at which point a dry stearic acid powder was added to the mixer in a quantity so as to obtain the weight % based on the weight of the marble indicated in Table 1. The temperature was so maintained and the contents on the mixer continued to be mixed under a stirring speed of 500 rpm for an additional 10 minutes.

The product so obtained was thereafter analysed by TGA in order to determine the total volatiles. The results are presented in Table 1.

Example 11—Invention Example 500 g of a cyclone-classified, marble from Carrara, Italy, dry ground using a glycol-based dry grinding aid and featuring a $d_{50}$ of approximately 1.7 microns and a BET specific surface area of between 3.8 and 4.0 m$^2$/g was added to an MTI Mixer and the mixing was activated at 500 rpm. Thereafter magnesium laurate in powder form was added to the mixer in a quantity so as to obtain the weight % based on the weight of the marble indicated in Table 1, and the mixer contents heated to 180° C. for a period of 10 minutes. Thereafter, the mixer contents continued to be mixed while allowed to cool to 130° C., at which point a dry stearic acid powder was added to the mixer in a quantity so as to obtain the weight % based on the weight of the marble indicated in Table 1. The temperature was so maintained and the contents on the mixer continued to be mixed under a stirring speed of 500 rpm for an additional 10 minutes.

The product so obtained was thereafter analysed by TGA in order to determine the total volatiles. The results are presented in Table 1.

TABLE 1

| | 1 Comparison | 2 Comparison | 3 Comparison | 4 Comparison | 5 Invention | 6 Invention |
|---|---|---|---|---|---|---|
| 1:1 Stearic acid:Palmitic acid | 1.2 wt % | 1.2 wt % | | 0.4 wt % | 0.4 wt % | 0.4 wt % |
| Pure stearic acid | | | | | | |
| Calcium stearate | | | 1.2 wt % | 0.8 wt % | 0.8 wt % | 0.8 wt % |
| Magnesium laurate | | | | | | |
| PDMS | | 500 ppm | | | | 500 ppm |
| Viscosity of isolated salt component of treatment agent at 180° C. (mPas) | — | — | >1 600 100 | >1 600 100 | >1 600 100 | >1 600 100 |
| Viscosity of equivalent acid/salt mixture at 180° C. (mPas) | — | — | — | <100 | <100 | <100 |
| Total quantity of acid and salt (wt % on wt of CaCO3) | 1.2 wt % | 1.2 wt % | 1.2 wt % | 1.2 wt % | 1.2 wt % | 1.2 wt % |
| Total volatiles evolved between 25 and 300° C. (+/−0.01%) | 0.45 mass % | 0.42 mass % | 0.16 mass % | 0.26 mass % | 0.16 mass % | 0.19 mass % |

| | 7 Invention | 8 Invention | 9 Invention | 10 Invention | 11 Invention |
|---|---|---|---|---|---|
| 1:1 Stearic acid:Palmitic acid | 0.4 wt % | 0.4 wt % | 0.4 wt % | | |
| Pure stearic acid | | | | 0.24 wt % | 0.36 wt % |
| Calcium stearate | 0.6 wt % | 1.0 wt % | 1.2 wt % | | |
| Magnesium laurate | | | | 0.96 wt % | 0.84 wt % |
| PDMS | | | | | |
| Viscosity of isolated salt component of treatment agent at 180° C. (mPas) | >1 600 100 | >1 600 100 | >1 600 100 | >1 600 100 | >1 600 100 |
| Viscosity of equivalent acid/salt mixture at 180° C. (mPas) | <100 | <100 | <100 | 50000 | 9000 |

TABLE 1-continued

| | | | | | |
|---|---|---|---|---|---|
| Total quantity of acid and salt (wt % on wt of CaCO3) | 1.0 wt % | 1.4 wt % | 1.6 wt % | 1.2 wt % | 1.2 wt % |
| Total volatiles evolved between 25 and 300° C. (+/−0.01%) | 0.19 mass % | 0.19 mass % | 0.22 mass % | 0.08 mass % | 0.09 mass % |

The invention claimed is:

1. A process for the preparation of a treated mineral filler product comprising the following sequential steps:
 (a) treating at least one dry mineral filler comprising calcium carbonate with calcium stearate under heat and mixing to obtain an intermediate mineral filler product comprising the at least one dry mineral filler coated with calcium stearate; and
 (b) treating the intermediate mineral filler product obtained in step (a) with a 1:1 mixture of stearic acid and palmitic acid,
 wherein the weight ratio of the mixture of stearic acid and palmitic acid to calcium stearate is 1:1.5 to 1:3,
 wherein the total amount of the stearic acid, palmitic acid and calcium stearate is 1.0 to 1.6 wt. %, based on the dry weight of the mineral filler, and
 wherein the treated mineral filler product has a total volatile content of less than 0.23% by mass at a temperature range of 25 and 300° C.

2. The process according to claim 1, wherein the at least one dry mineral filler subjected to treatment in step (a) is precipitated calcium carbonate (PCC) and/or natural ground calcium carbonate (NGCC).

3. The process according to claim 1, wherein the at least one dry mineral filler subjected to treatment in step (a) is precipitated calcium carbonate (PCC) of one or more of aragonitic, vateritic and calcitic mineralogical crystal forms.

4. The process according to claim 1, wherein the at least one dry mineral filler subjected to treatment in step (a) is natural ground calcium carbonate (NGCC) prepared from marble, limestone, or chalk, and optionally comprising dolomite.

5. The process according to claim 1, wherein the at least one dry mineral filler subjected to treatment in step (a) comprises marble and/or dolomite.

6. The process according to claim 1, wherein the at least one dry mineral filler is dry or wet ground prior to treatment in step (a).

7. The process according to claim 1, wherein the at least one dry mineral filler is subjected to benefication prior to treatment in step (a).

8. The process according to claim 1, wherein the at least one dry mineral filler is subjected to classification prior to treatment in step (a).

9. The process according to claim 1, wherein the at least one dry mineral filler subjected to treatment in step (a) has a $d_{50}$ of 0.5 to 10 microns.

10. The process according to claim 1, wherein the at least one dry mineral filler subjected to treatment in step (a) has a $d_{50}$ of 1.5 to 1.8 microns.

11. The process according to claim 1, wherein the at least one dry mineral filler subjected to treatment in step (a) has a $d_{98}$ of less than 25 microns.

12. The process according to claim 1, wherein the at least one dry mineral filler subjected to treatment in step (a) has less than 0.2% by weight of water relative to mineral filler weight.

13. The process according to claim 1, wherein the at least one dry mineral filler subjected to treatment in step (a) has from 0.1 to 0.2% by weight of water relative to mineral filler weight.

14. The process according to claim 1, wherein the calcium stearate introduced in step (a) is in the form of a dry powder.

15. The process according to claim 1, wherein the calcium stearate introduced in step (a) has a $d_{98}$ of 20 microns.

16. The process according to claim 1, wherein the calcium stearate introduced in step (a) has a viscosity of more than 100,000 mPas.

17. The process according to claim 1, wherein the calcium stearate employed in step (a) has a viscosity of more than 1,000,000 mPas.

18. The process according to claim 1, wherein the mixture of stearic acid and palmitic acid introduced in step (b) is in the form of a melt.

19. The process according to claim 1, wherein a total amount of the calcium stearate introduced in step (a) and the mixture of stearic acid and palmitic acid introduced in step (b) is 0.2 to 8 mg of total calcium stearate and mixture of stearic acid and palmitic acid per $m^2$ of mineral filler.

20. The process according to claim 1, wherein a total amount of the calcium stearate introduced in step (a) and the mixture of stearic acid and palmitic acid introduced in step (b) is 0.6 to 5 mg of total calcium stearate and mixture of stearic acid and palmitic acid per $m^2$ of mineral filler.

21. The process according to claim 1, wherein a total amount of the calcium stearate introduced in step (a) and the mixture of stearic acid and palmitic acid introduced in step (b) is 3 to 4 mg of total calcium stearate and mixture of stearic acid and palmitic acid per $m^2$ of mineral filler.

22. The process according to claim 1, wherein 0.4 by weight % of the mixture of stearic acid and palmitic acid, based on the weight of the mineral filler, is introduced in step (b), and 0.6 to 1.2 by weight % of the calcium stearate, based on the weight of the mineral filler, is introduced in step (a).

23. The process according to claim 1, wherein 0.4 by weight % of the mixture of stearic acid and palmitic acid, based on the weight of the mineral filler, is introduced in step (b), and 0.8 by weight % of the calcium stearate, based on the weight of the mineral filler, is introduced in step (a).

24. The process according to claim 1, wherein the mixture of stearic acid and palmitic acid in step (b) and the calcium stearate in step (a) are introduced at a weight ratio of 1:2.

25. The process according to claim 1, wherein an additional treatment agent that does not correspond to the mixture of stearic acid and palmitic acid, nor calcium stearate, is introduced during the process.

26. The process according to claim 25, wherein the additional treatment agent is a siloxane.

27. The process according to claim 25, wherein the additional treatment agent is a polydimethylsiloxane (PDMS).

28. The process according to claim 26, wherein the siloxane is dosed at 200 to 1000 ppm.

29. The process according to claim 26, wherein the siloxane is dosed at 400 to 600 ppm.

30. The process according to claim 26, wherein the siloxane is dosed at 500 ppm.

31. The process according to claim 26, wherein the siloxane is introduced following step (b).

* * * * *